United States Patent [19]

Caissel

[11] Patent Number: 4,990,449
[45] Date of Patent: Feb. 5, 1991

[54] COMPOST-CONTAINING CARTRIDGE FOR BIOLOGICAL REGENERATION OF AN AGUATIC MEDIUM

[76] Inventor: Jacques Caissel, 9 rue du Sénéchal, 31000 Toulouse, France

[21] Appl. No.: 340,388

[22] Filed: Apr. 19, 1989

[51] Int. Cl.$^5$ .................. C12N 11/00; C02F 3/00; C12M 1/40
[52] U.S. Cl. ..................... 435/174; 210/601; 210/615; 210/617; 435/252.1; 435/262; 435/288; 435/831
[58] Field of Search ............... 435/170, 174, 177, 182, 435/252.1, 831, 262, 288; 210/601, 615, 617

[56] References Cited

U.S. PATENT DOCUMENTS 3,860,490 1/1975 Guttag .................. 435/182

FOREIGN PATENT DOCUMENTS 2143544 2/1985 United Kingdom .

Primary Examiner—David M. Naff
Attorney, Agent, or Firm—Harold H. Dutton, Jr.

[57] ABSTRACT

A cartridge for biological regeneration of an aquatic medium such as an aquarium is prepared by providing a receptacle containing an organic compost, and having means for allowing passage of water into the receptacle, through the compost and out of the receptacle. The compost contains nitrophilic bacteria of the azobacter family and is produced by complete fermentation of a mixture of animal manures and vegetable wastes. The receptable has two faces and permits passage of water from one face toward the other. A water permeable layer such as a gravel layer is adjacent each of the faces for retaining the compost. One of the faces may include a bottom panel having a plurality of water passage openings and a removable film sealing the openings. The other face may have a removable cover, and a plate having a plurality of water passage openings positioned between the cover and adjacent water permeable layer. The cartridge may be arranged at the bottom of an aquarium or in an external aquarium filter.

6 Claims, 2 Drawing Sheets

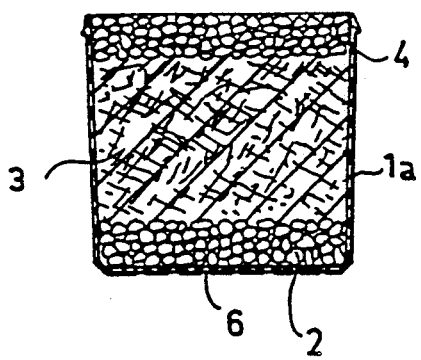
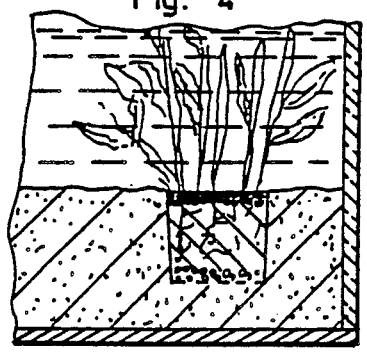
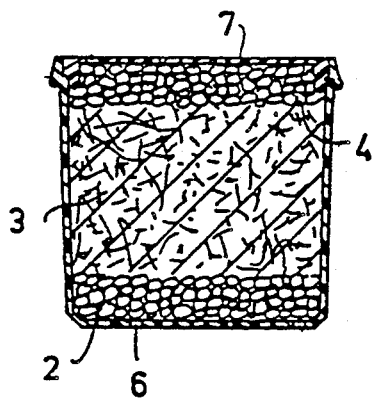
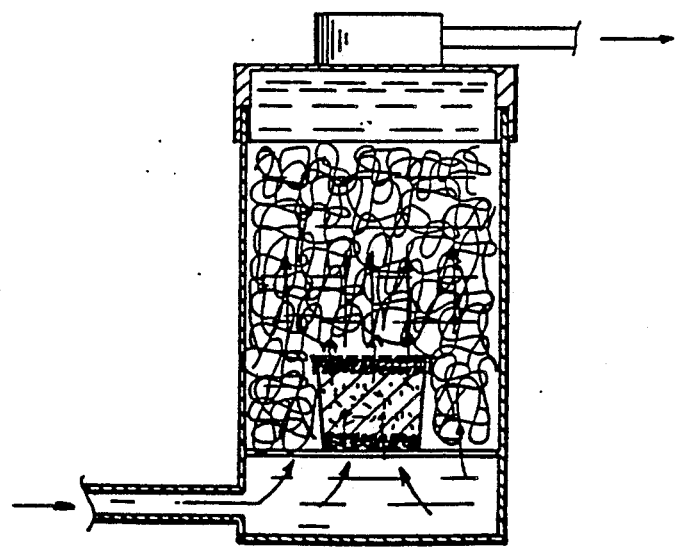
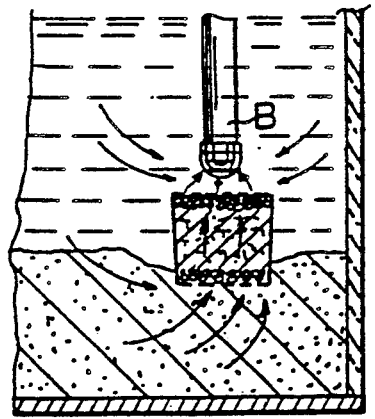

COMPOST-CONTAINING CARTIDGE FOR BIOLOGICAL REGENERATION OF AN AGUATIC MEDIUM

This invention relates to a product for the biological regeneration of an aquatic medium, in particular the water of an aquarium. The invention also relates to a process for the regeneration of such water utilizing the product.

BACKGROUND AND OBJECTS OF THE INVENTION

In French patent application No. 85.16093 filed Oct. 28, 1985 in the name of the present inventor, published under No. 2,589,034, there is described an organic conditioner and a process for its production, for enriching soil and for contributing to cultures the nutritive elements necessary for their development. The process for producing this conditioner essentially comprises:

(a) collecting animal manure, such as sheep, cattle or horse manure;

(b) collecting vegetable wastes, such as corn cobs, vegetable ensilage wastes or tree or branch trimmings;

(c) pulverizing the vegetable wastes;

(d) mixing the animal manures and the pulverized vegetable wastes;

(e) moistening the mixture or the components before mixing;

(f) preparing windrows of the moistened mixture in side by side fashion in a composting area;

(g) ventilating each windrow by intermittent aspiration of air through the windrows;

(h) controlling the temperature at the center of the windrows and recovering the compost at the end of fermentation when the temperature decreases below a predetermined level;

(i) recycling the thus recovered compost while mixing and preparing new windrows therefrom in a ripening area;

(j) ventilating these new windrows by blowing air for assuring a complementary fermentation and a first drying;

(k) subjecting the compost to a complementary drying; and (l) ripening the compost while subjecting it to a final grinding step.

Preferably, the animal manures and the ground vegetable wastes are mixed in a weight proportion of manure to vegetable waste of between 30% and 50%. Further, after drying, the compost is subjected to a final grinding or crushing which, in particular, reduces its average granulometry or particle size to an approximate value of between 0.1 mm and 3 mm.

Reference is had to the above mentioned French patent application for more details on this production and on the installation and equipment used, and the specification of this patent is incorporated herein by reference.

This production leads to an organic conditioner, rich in organic materials, nitrogen and mineral products, and the fermentation of which is complete.

The applicant has discovered that this conditioner may be used as a water regeneration product, particularly for aquarium water, and that it gives remarkable and unexpected results on both animal and plant life in the aquarium, while reestablishing the natural cycle of nitrogen by transforming toxic nitrites into non-toxic nitrates.

Thus, a primary object of the present invention is to provide a new product for biological regeneration of water, and more generally for an aquatic medium, capable of transforming the nitrites contained in the medium into nitrates which can be directly assimilated by aquatic plants.

DESCRIPTION OF THE INVENTION

The biological regeneration product according to the invention is characterized in that it is an organic conditioner containing nitrophilic bacteria of the azobacter family, and is produced by complete fermentation of a mixture of animal manures and vegetable wastes.

This water regeneration product may particularly be produced from the natural organic conditioner produced by carrying out the process previously described as explained in French patent 2,589,034.

Analyses have shown that this conditioner contains azobacter bacteria which condition the reestablishment of the natural nitrogen cycle in the aquatic medium by transforming toxic nitrites into nitrates useful by plants.

The optimum dose to be used is about 20 g to 40 g of the conditioner per 100 liters of water to be regenerated. The conditioner is provided in a location in which there exists a circulation of the water, either on the inside of the aquarium, in particular near the suction nozzles of the filtration system, or on the interior of an external aquarium filter.

The favorable effects observed on the plants and the fish come from a modification of the characteristics of the water (nitrites transformed into nitrates) which produces a more rapid growth of the aquatic plants, a complete elimination of algae, and a strengthening of the plants (more brilliant colors, etc.)

The regeneration product according to the invention is preferably provided in a carton having two opposing faces to permit the passage of water through the carton or cartridge and the conditioner. The organic conditioner is interposed in the cartridge between two water permeable layers, for example layers of small gravel, which are arranged at the faces of the carton in order to retain the conditioner.

In particular, the carton has a bottom perforated by a plurality of water passage openings, the openings being closed by a thin, self-adherent plastic or foil film to be removed, and an open opposite face provided with a cover clipped onto the circumference of the carton. A plate provided with a plurality of water passage openings may, in some cases, be placed between the cover and the gravel layer to assure retention of the layers of gravel when the cover is removed.

The carton may be used on the interior of an aquarium, on or in the sand bottom, or in an external aquarium filter. The thin film is removed from the perforated bottom, the cover is removed, and in one embodiment, the carton is immersed with the bottom in the sand. In another embodiment, the carton is inserted into the filter in such a manner that the water will flow through the carton.

In some cases, the conditioning product according to the invention may be provided in packets having water permeable walls, intended to be immersed to the bottom of the aquarium, or may even be provided in the form of a packet intended to be inserted under the sand.

DESCRIPTION OF THE DRAWINGS

The description which follows with reference to the annexed drawings presents one embodiment of a regeneration carton according to the invention, and illustrates the use of the carton. In the drawings:

FIG. 3 is a schematic view of the carton ready to be used on the interior of an aquarium, in order to permit carrying out the planting of plants therein;

FIG. 4 is a schematic view of the carton in place in an aquarium;

FIG. 5 is a schematic view of the carton ready to be used in an aquarium (without planting) or in an external aquarium filter; and FIGS. 6 and 7 are schematic views showing the carton in place in the aquarium or in an external filter.

DESCRIPTION OF PREFERRED EMBODIMENTS

Figure 1:
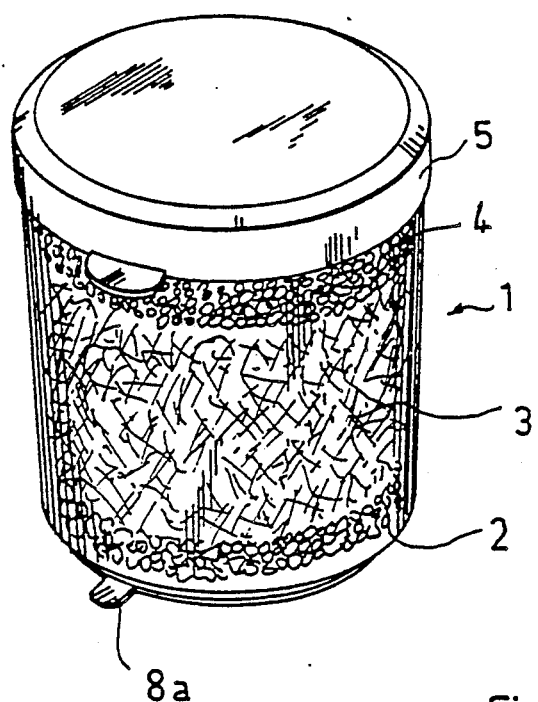
FIG. 1 is a perspective view of the regeneration carton or cartridge.
Figure 2:
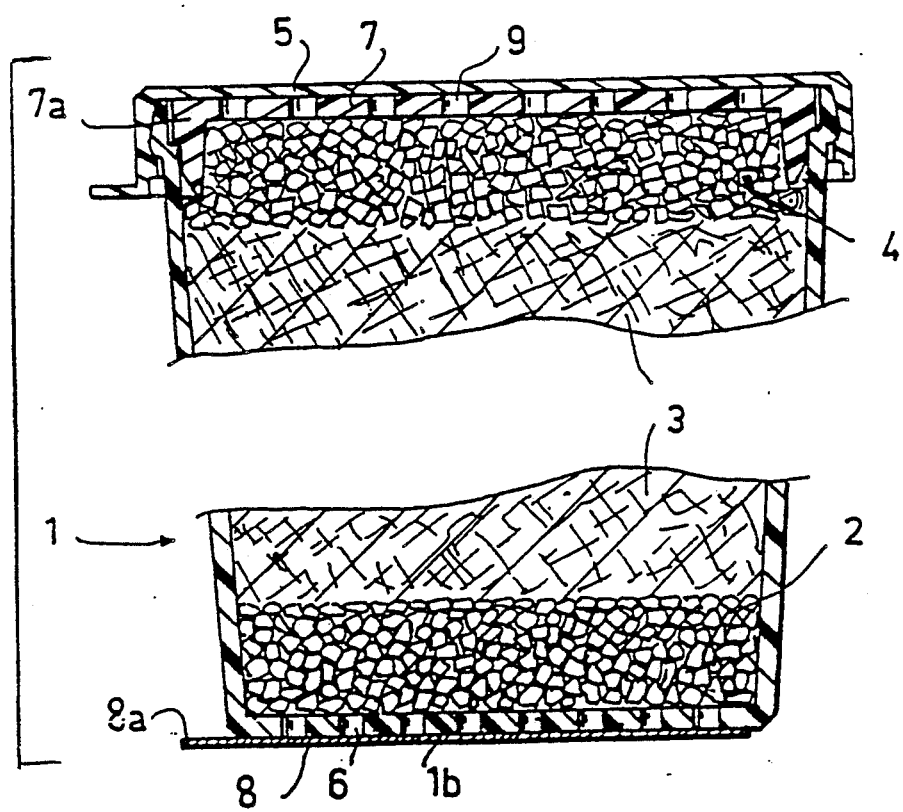
FIG. 2 is a fragmentary cross sectional view along an axial plane, on an enlarged scale of the carton of FIG. 1.

The biological water regeneration carton, shown by way of example in FIGS. 1 and 2, comprises a rigid cup 1 molded of an inert, synthetic, transparent material, in which have been arranged three superposed layers: a bottom layer of small gravel 2, an intermediate layer of the regeneration product 3 and a top layer 4 similar to the layer 2.

The cup 1 has a bottom 1b and a slightly tapered or frustoconical lateral wall 1a, with an upper open face or top.

The layer of regeneration product 3 occupies about 70-80% of the height of the cup and is slightly compressed between the two layers of gravel 2 and 4. This product comprises an organic conditioner produced by the process described above and in more detail in French Patent 2,589,034. Analyses have shown that it contains in particular bacteria of the azobacter family.

The dose of the regeneration product to be provided is approximately 0.2 to 0.4 gram per liter of water to be regenerated. In the example, the carton is provided for the regeneration of a volume of 50 liters of water containing about 10-20 g of product, in particular 15 g. When producing this product, the last step comprising a final grinding is carried out in such a manner that the average granulometry or particle size of the product obtained is about 1 mm.

The cup 1 is provided with a cover 5 which is clipped over a flange around the upper edge of the cup. A tab 5a facilitates removal of the cover.

The bottom 1b of the cup is provided with a plurality of openings 6, having diameters less than about 2.5 mm and preferably on the order of 2 mm. These openings are provided in an appropriate number to form a total cross sectional area of passages between about 0.5 and 1.5 cm².

The gravel which forms the lower layer 2 and the upper layer 4 has an average granulometry on the order of 3-4 mm, greater than that of the openings 6.

Adhered to the bottom is a thin, self-adherent layer 8 which closes the openings 6. This layer may be easily detached due to provision of a tab 8a which extends from one side.

In the embodiment of FIG. 2, the carton is provided with a plate 7 which is arranged between the cover 5 and the gravel layer 4, and is perforated by a plurality of openings 9 of which the dimensions and the distribution are the same as those of the openings 6 on the bottom. In the example shown, this plate 7 has a peripheral flange 7a which extends into the carton and rests on an interior shoulder therein. The plate 7 may be sealed in this position.

The carton according to the invention may be used inside of an aquarium such shown in FIGS. 3 and 4 in order to aid in carrying out plantings therein. In this case, a carton is used without the upper plate. The cover 5 of the carton is removed and the film 8 is also removed from the bottom 1b. The carton is then ready as shown in FIG. 3 with one upper face open, and a bottom permitting the passage of water through the openings 6.

The carton is immersed into the aquarium and buried in the sand as shown in FIG. 4. The carton then functions to regenerate the water, while permitting planting of plants directly in the carton.

The carton according to the invention may also be used with the sole function of regenerating the water. In this case, a carton having a perforated plate 7 is used. The cover 5 is removed and the thin film 8 is pulled off from the bottom 1b. The carton is then ready as seen in FIG. 5.

The carton may then be placed on its bottom in the sand of the aquarium in such a manner as to have a stable position such as shown in FIG. 6, near a suction nozzle B. The carton is thus subjected to an internal circulation of water and assures a biological regeneration of the water by transforming the nitrites into nitrates. At the end of about a month, improved growth of the plants can be seen, increased vigor of the animals and a disappearance of algae.

It should be noted that these effects continue for several months with a constant efficacy (between 6 and 9 months). At the end of this period, the spent carton must be removed because it seems that the reverse phenomena may then arise (transformation of nitrates into nitrites) with undesireable effects on the aquarium.

It is emphasized that the following favorable effects continue during the period of efficacy: reduction of the fish excrement resting on the bottom of the aquarium. better acclimation of newly introduced fish in the aquarium.

The carton according to the invention may also be used in an external aquarium filter as shown in FIG. 7. In this case, the carton such as shown in FIG. 5 is arranged in the filter in such a manner that its axis is positioned along the direction of circulation of the water flow in order to be traversed by at least a portion of the water.

While this invention has been described as having certain preferred features and embodiments, it will be understood that it is capable of still further variation and modification without departing from the spirit of the invention, and this application is intended to cover any and all variations, modifications and adaptations of the invention which fall within the spirit of the invention and the scope of the appended claims.

I claim:

1. A cartridge for the biological regeneration of an aquatic aquarium medium comprising a receptacle containing an organic compost including nithrophilic bacteria of the azobacter family and produced by the complete fermentation of a mixture of animal manures and vegetable wastes, said receptacle including means allowing the passage of water into said receptacle, through said compost in said receptacle and out of said receptacle, said means allowing the passage of water comprising two faces of said receptacle permitting passage of water from one face toward the other, a water permeable layer adjacent each of said faces for retaining said compost, and said compost being interposed between said layers.

2. A cartridge as in claim 1 and comprising between about 20 g and 40 g said compost per 100 liters of water to be regenerated.

3. A cartridge as in claim 1 and wherein one of said faces of said receptacle comprises a bottom panel having a plurality of water passage openings therein, and a removable film sealing said openings, and the other of said faces having a removable cover secured to the periphery of the receptacle.

4. A cartridge as in claim 3 and including a plate having a plurality of water passage openings and positioned between the cover and the adjacent one of said water permeable layers.

5. A cartridge for the biological regeneration of an aquatic medium in an aquarium comprising an organic compost containing nitrophilic bacteria of the azobacter family produced by complete fermentation of a mixture of animal manures and vegetable wastes and a water permeable receptacle therefore, said receptacle including two opposing faces permitting passage of water from one face toward the other with said organic compost being interposed between two water permeable layers arranged adjacent said faces for retaining the compost, said receptacle including a bottom having a plurality of water passage openings and a removable film sealing said openings and an opposite face having a removable cover attached to the periphery of the receptacle said opposite face of said receptacle including a plate having a plurality of water passage openings and positioned between the cover and the adjacent one of said water permeable layers, each of said water permeable layers comprising gravel.

6. A cartridge as in claim 5 and wherein said receptacle is sized for the regeneration of 50 liters of water and contains between 10 g and 20 g of said compost, said layers comprising gravel having an average granulometry of about 3 to 4 mm, and said water passage openings of the bottom and of the plate having diameters less than 2.5 mm and being provided in a number appropriate to form a total cross-section for the passage of water of between 0.5 and 1.5 cm$^2$.

* * * * *